United States Patent Office 2,972,522
Patented Feb. 21, 1961

2,972,522
SULFUR PRODUCTION

Peter Urban, Chicago, Ill., assignor, by mesne assignments, to Universal Oil Products Company, Des Plaines, Ill., a corporation of Delaware No Drawing. Filed Aug. 30, 1956, Ser. No. 606,955

7 Claims. (Cl. 23—225)

This invention relates to a process for producing sulfur from hydrogen sulfide and in particular relates to a process for oxidizing hydrogen sulfide in a specific solution and employing a specific heterogeneous catalyst.

Hydrogen sulfide is a common material available from many sources. It is very frequently useful only when converted to some other material such as sulfur or sulfuric acid, however, recovering hydrogen sulfide for the purpose of converting it is frequently difficult. For example, in refining petroleum, hydrogen sulfide is produced in large quantities as an undesirable contaminant mixed with larger quantities of other material. Frequently the hydrogen sulfide which is produced is passed to the atmosphere as a waste material since the cost of recovering it is not warranted by the value of the product recovered. In populous areas disposing of hydrogen sulfide to the atmosphere represents a nuisance and in these cases expensive recovery methods must be employed even though they are not economically justified.

In some cases hydrogen sulfide must be removed from various process streams in order to prevent the contamination of those streams. For example, the presence of sulfur compounds in gasoline is detrimental since they have a suppressing effect on octane number and cause the gasoline to be corrosive, unstable and sour. In some process streams hydrogen sulfide must be removed to prevent its detrimental effect upon subsequently employed catalysts. For example, in catalytically reforming a gasoline fraction, a net hydrogen production is realized which is at least partially recirculated to the reforming zone to saturate olefinic material and to prevent carbonization of the catalyst. It is desirable for the recycled hydrogen-containing stream to contain as little hydrogen sulfide as possible thereby preventing its undesirable effect upon the catalyst. It is, therefore, often necessary and always desirable to remove hydrogen sulfide from this and similar streams. The present invention provides a means for recovering the valuable sulfur from hydrogen sulfide and furthermore provides an economical and efficient means for removing hydrogen sulfide from other material even though it is present in relatively low concentrations.

Briefly, the present invention provides a process for recovering sulfur from hydrogen sulfide by absorbing hydrogen sulfide in an ammoniacal or amine solution and oxidizing the hydrogen sulfide thus absorbed with oxygen in the presence of a specific heterogeneous catalyst. In the presence of the specific solutions and specific catalyst of this invention ordinary air may be employed at low temperature to produce sulfur directly from the hydrogen sulfide thus absorbed.

The specific catalyst employed in this invention is a composite of an adsorptive base and an organo-metallic compound whose metallic component is selected from the group consisting of iron, cobalt, nickel, copper, molybdenum, manganese, tungsten, vanadium and chromium or mixtures of these. The catalysts may be made of any organo-metallic compound of the above named metals such as their histadines. Some typical examples of these are cobalt histadine, iron histadine, etc. The organo-metallic compounds are composited with an adsorptive base such as activated charcoal, silica, alumina, zirconia, kieselguhr, bauxite, diatomaceous earth or other natural or synthetic highly porous relatively inert inorganic supports. The means of compositing may be any of those commonly practiced in the art such as impregnating the support by immersing it in a solution of the organo-metallic compound and subsequently drying it. It is, of course, essential that the drying or other activating means employed be under conditions that do not destroy the catalytic nature of the composite or the catalyst itself.

The solutions employed must be ammoniacal or amine solutions, however, they need not be aqueous and, in fact, are preferably alcoholic. The amine solutions used may comprise ethanolamine, propanolamine, butanolamine, diethanolamine, pyridine, pyrrolidine, alkylpyridines, alkylpyrrolidines, piperidine, its derivatives and the like. When employing the specific catalyst and specific solutions of this invention, elemental sulfur is recovered from the process with very small production of undesirable sulfur compounds such as thiophenes, mercaptans, etc., and the sulfur is recovered as a solid phase which is easily separated from the solution.

The process of the present invention may be effected in any suitable apparatus which may be specially adapted for the particular hydrogen sulfide stream to be treated. For example, when a stream having a high hydrogen sulfide concentration is employed the process may be effected simply by absorbing both the hydrogen sulfide and oxygen in a pool of solvent containing the heterogeneous catalyst. When the source of hydrogen sulfide is a process stream which is to be purified, the solvent may be used in a separate zone as an absorbing medium to remove hydrogen sulfide from the main stream thereby purifying that stream. The hydrogen sulfide-rich solvent may then be passed to a separate reaction zone wherein it is contacted with oxygen in the presence of the catalyst of this invention thereby producing sulfur and regenerating the solvent for further use in purifying the process stream.

The process may be effected using air or using oxygen by itself or mixed with other gases and it may be effected by simply absorbing the reactants in a pool of solvent or in a slurry or suspensoid operation wherein the reactants pass concurrently or countercurrently with the moving solvent and catalyst. The reaction may be effected in a countercurrent, multi-stage manner when complete recovery and conversion are desired and when so effected, any degree of recovery and conversion may be obtained by employing a sufficient number of stages.

Following are several examples which illustrate the operability and utility of the present invention and are intended to be illustrative rather than limiting on its broad scope.

*Example I*

A mixture of hydrogen sulfide gas and air was bubbled through an aqueous ammonia solution at 25° C. and, when saturation was complete, the solution stood for 45 minutes. Subsequently, the solution was evaporated to dryness and 4.7% of the original sulfur was recovered in the form of elemental sulfur.

*Example II*

The $H_2S$-air mixture of the previous example was bubbled through an aqueous ammonia solution at 25° C. which contained a catalyst consisting of 0.01% cobalt histidine impregnated on charcoal. Upon evaporation it was found that 32% of the sulfur was converted to elemental sulfur.

*Example III*

The $H_2S$-air mixture of the previous examples was bubbled through an isopropanol solution of ammonia at 25° C. which contained a catalyst manufactured by impregnating 0.1% cobalt histidine on silica. Upon evaporation of the solution 37% of the sulfur was found to be converted to elemental sulfur.

The foregoing examples are illustrative of the large magnitude of improvement effected by the catalysts of this invention. When effecting this process without a catalyst at ordinary temperatures only 4.7% of the sulfur is converted to the recoverable elemental form. By employing a catalyst at the same conditions, large yield improvements, some over ten-fold, may be effected. Although the examples in many cases show very low sulfur recoveries, unfavorable conditions for the process were selected for the experiments so that the magnitude of improvement could be more readily observed. It must, of course, be realized that when operating with more concentrated solutions containing larger amounts of catalyst and processing at higher temperatures, substantially complete conversion of sulfur may be readily effected.

It is within the scope of this invention to employ solvents other than those mentioned in the examples. The use of a solvent appears to effect a close contact of the catalyst and the reactants which causes the desired oxidation reactions to occur. Any solvent which mutually dissolves the $H_2S$ and oxygen reactants as well as the catalyst may be used, but it is essential that a solvent be present since one of the elements of this invention is the combination of a solvent and a catalyst since neither will perform the desired function alone. Other solvents may include ketones, aldehydes, weak acids, glycols, etc.

As hereinbefore stated, more severe operating conditions than those of the examples will usually be used. The process preferably will be operated at a temperature of from about 100° F. to about 400° F. Superatmospheric pressures may be used and will be beneficial in allowing higher operating temperatures while still maintaining liquid phase solvents and in increasing the solubility of the vapor phase reactants in the solution.

One of the important features of this process is that, when using the method and catalysts of this invention, the $H_2S$ is converted substantially completely to sulfur rather than mercaptans or thio-compounds. These materials are normally readily formed at conditions that produce $H_2S$ and are usually just as harmful and difficult to separate and dispose of as $H_2S$. Conversion to sulfur in the solid, or immiscible liquid phase results in a valuable, easily separated and non-noxious product.

I claim as my invention:

1. The process for converting hydrogen sulfide to sulfur which comprises reacting said hydrogen sulfide with oxygen in a basic nitrogen-compound solution in the presence of a catalyst comprising cobalt histidine.

2. The process for converting hydrogen sulfide to sulfur which comprises reacting hydrogen sulfide with oxygen in an aqueous ammonia solution in the presence of a catalyst comprising cobalt histidine.

3. The process for converting hydrogen sulfide to sulfur which comprises reacting hydrogen sulfide with oxygen in an isopropanol solution of ammonia in the presence of a catalyst comprising cobalt histidine.

4. The process of claim 1 wherein said catalyst is composited with charcoal.

5. The process of claim 1 wherein said catalyst is composited with silica.

6. The process for converting hydrogen sulfide to sulfur which comprises reacting hydrogen sulfide with oxygen in an aqueous ammonia solution in the presence of a catalyst comprising cobalt histidine.

7. The process for converting hydrogen sulfide to sulfur which comprises reacting hydrogen sulfide with oxygen in an isopropanol solution of ammonia in the presence of a catalyst comprising cobalt histidine.

References Cited in the file of this patent

UNITED STATES PATENTS

| | | |
|---|---|---|
| 1,700,698 | Fulweiler | Jan. 29, 1929 |
| 1,854,847 | Kuhn | Apr. 19, 1932 |
| 2,662,860 | Engel et al. | Dec. 15, 1953 |
| 2,772,146 | Pippig | Nov. 27, 1956 |

FOREIGN PATENTS

| | | |
|---|---|---|
| 392,544 | Great Britain | May 16, 1933 |
| 731,696 | Great Britain | June 15, 1955 |

OTHER REFERENCES

Lowry et al.; "An Introduction to Organic Chemistry," 7th ed. (1951), John Wiley and Sons, Inc., p. 400.